United States Patent [19]
Martin

[11] 3,879,614
[45] Apr. 22, 1975

[54] METHOD OF MEASURING THE WINDUP WEIGHT OF A MOVING STRETCHABLE MATERIAL

[75] Inventor: Orin K. Martin, San Jose, Calif.

[73] Assignee: Measurex Corporation, Cupertino, Calif.

[22] Filed: May 30, 1974

[21] Appl. No.: 474,722

Related U.S. Application Data

[63] Continuation of Ser. No. 378,431, July 12, 1973, abandoned.

[52] U.S. Cl. .............. 250/548; 250/571; 356/199
[51] Int. Cl. ... G01j 1/20; G01n 21/18; G01n 21/30
[58] Field of Search ............ 250/548, 571; 356/199

[56] References Cited
UNITED STATES PATENTS

| | | | |
|---|---|---|---|
| 2,466,615 | 4/1949 | Rusca et al. | 250/571 X |
| 2,528,157 | 10/1950 | Menke | 250/548 X |
| 2,674,151 | 4/1954 | Garrett et al. | 250/548 X |

Primary Examiner—James W. Lawrence
Assistant Examiner—T. N. Grigsby
Attorney, Agent, or Firm—Flehr, Hohbach, Test, Albritton & Herbert

[57] ABSTRACT

A method of determining the windup weight of stretchable material being manufactured by a machine includes the step of measuring weight per unit area at a scanner location remote from the windup reel and compensating such weight per unit area measurement by a growth ratio which is the ratio of the product of the speed and width of the material at the measuring location divided by the speed and width of the material at the windup reel location.

4 Claims, 3 Drawing Figures

METHOD OF MEASURING THE WINDUP WEIGHT OF A MOVING STRETCHABLE MATERIAL

This is a continuation, of application Ser. No. 378,431 filed July 12, 1973 now abandoned.

BACKGROUND OF THE INVENTION

The present invention is directed in general to a method of measuring the windup weight of a moving stretchable material being manufactured by machine and, more specifically, to the weight of tire fabric which is the combination of rubber and cord.

In a machine manufacturing rubber tire fabric tension exists between the windup reel and the calender rolls since the speed of the windup reel is normally slightly greater than at the calender rolls. It is, of course, desirable to control the fabric weight to a very close target value with a minimum deviation from target for maximum economy. The measurement of the fabric weight, or rather more accurately, its weight per unit area can typically be easily accomplished near the calender rolls by a scanning device such as that used on a paper making machine where radiation gauges are mounted on a carriage and scan across the width of the tire fabric. The amount of radiation in accordance with the Beer-Lambert laws which is absorbed determines the weight per unit area of the material. Such weight per unit area gauges are now well known in the art. However, it is not generally desirable to mount such gauges near the windup reel since the transport delay between the point of measurement and the point at which control can be exerted would be too long to control the process to the desired accuracy.

Thus, in summary, because of the dynamic variation of the stretchable material or tire fabric being manufactured, it has been heretofore not possible to manufacture tire fabric sufficiently on target specification with a low percentage deviation.

OBJECT AND SUMMARY OF THE INVENTION

It is, therefore, an object of the present invention to provide a method of measuring the windup weight of a moving stretchable material being manufactured by a machine where the windup weight may be ascertained within narrow limits.

In accordance with the above object there is provided a method of measuring the windup weight of a moving stretchable material being manufactured by a machine. The material is held under tension between calender rolls and a windup reel. The weight per unit area of the moving material is sensed at a scanning location displaced from the windup reel. The width and speed of the material are sensed at the scanning location and at the windup reel, and the windup weight is determined by $$WT_{windup} = \frac{WIDTH_{scanner} \; SPEED_{scanner}}{WIDTH_{windup} \; SPEED_{windup}} \times WT_{scanner}$$

DETAILED DESCRIPTION OF THE PREFERRED EMBODIMENTS

Figure 1:
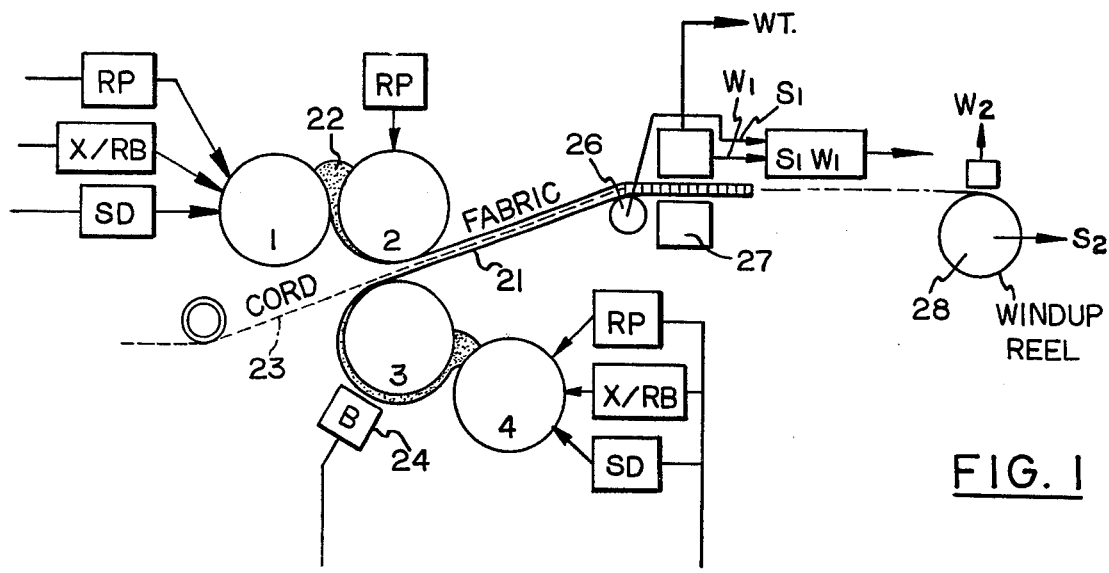
FIG. 1 is a simplified schematic showing a machine for manufacturing stretchable fabric.

Referring now to FIG. 1, the stretchable fabric 21 is manufactured by a calender operation designated by rolls 1, 2, 3 and 4. Here, rubberized material 22 is metered and fixed on each side of the cord 23. Various parameters of the calenders 1 through 4 are adjusted to produce a final fabric 21 of a certain weight per unit area. These include speed, roll position and roll bending. The measurement 24 indicates T is for the purpose of providing weights of the rubber material 22 being applied to the fabric and providing feedback control. Fabric 21 after being manufactured is passed over an idler roller 26 through a gauging system 27 to a winding reel 28. Gauging system 27 as will be discussed in detail below provides the weight per unit area at that point. By means of a tachometer coupled to idler wheel 26, the speed $S_1$ of the material at the gauge or scanner location 27 is measured. In addition, the width $W_1$ is provided by scanner device 27.

Figure 2:
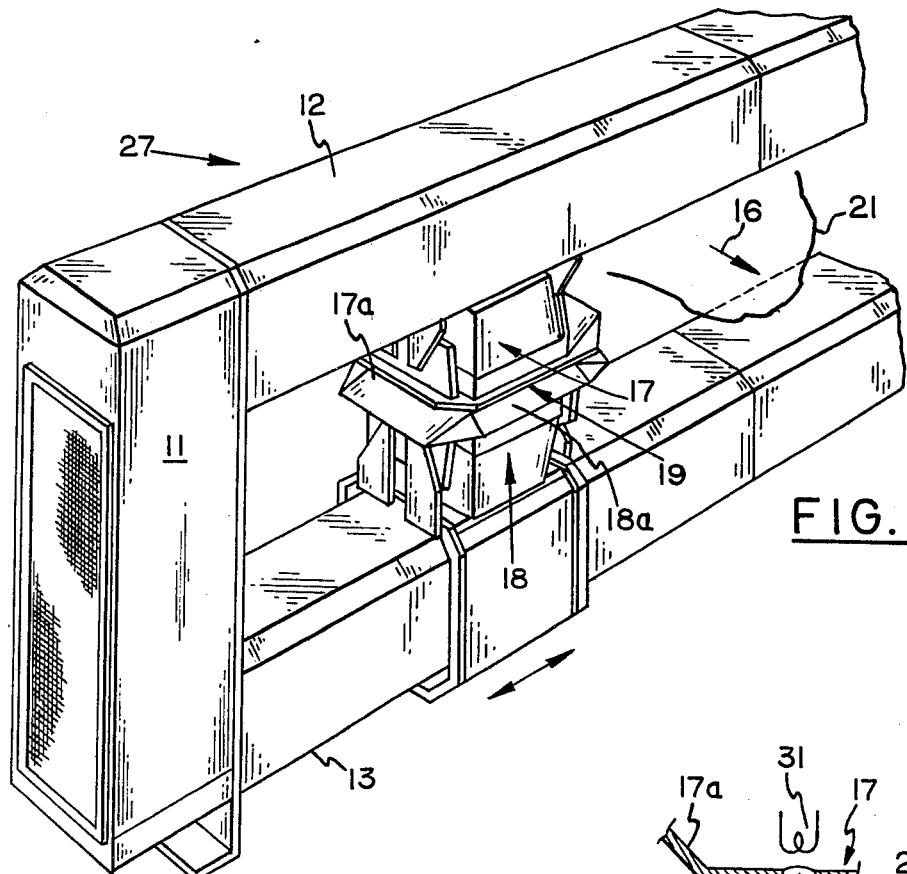
FIG. 2 is a perspective view of a scanning device used in FIG. 1.

Scanner 27 referring to FIG. 2 includes a framework 11 having a pair of spaced upper and lower parallel beams 12, 13 which extend laterally of the sheet material or fabric indicated at 21. Fabric 21 travels through scanner 27 in the direction shown by arrow 16. Upper and lower gauging heads 17, 18 are provided on the framework 11 and travel longitudinally of the framework and transversely of the fabric 21.

Specifically, fabric 21 travels through a gap 19 formed by the guides 17a and 18a. The lower gauging head 18 contains a radiation source which emits radiation that impinges upon the fabric 21. The intensity of this radiation after it has been attenuated by the fabric is sensed by the radiation detector which is included in gauging head 17. As discussed above, the amount of attenuation according to the Beer-Lambert laws determines the weight of the material in a manner well known in the art.

The weight per unit area measuring device may also be pneumatic or a thickness measuring device (assuming constant density) or other suitable device. And the scanning heads 17 and 18 may be replaced by one or more stationary heads.

Figure 3:
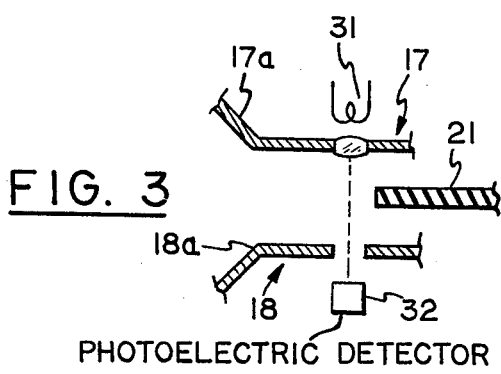
FIG. 3 is a fragmented cross sectional view which is representative of portions of FIGS. 1 and 2.

FIG. 3 illustrates a portion of the gauging heads 17 and 18 which is utilized to sense the width of the fabric 21 being scanned by the scanner. It is simply a photoelectric sensing system where the beam from a light source 21 is detected by a photoelectric detector 32 when the scanner passes over the edge of fabric 21. The amount of movement of the carriage heads 17 and 18 can be easily determined between photoelectric sensing points by a suitable detection apparatus such as a tachometer coupled to the head driving motor (not shown).

Similarly, and now referring to FIG. 1, the width $W_2$ of the fabric at the windup reel can be determined by a similar photoelectric sensing device located at the windup reel.

In order to compute the weight per unit area of the fabric at the windup reel, the following method is used.

By the theory of conservation of mass over time, the width speed and weight per unit area of the fabric 21 at the scanner location 27 is equal to the same factors at the windup reel.

Thus, the following equality can be written:

$$WT_{scanner} \times WIDTH_{scanner} \times SPEED_{scanner} = $$
(1)
$$WT_{windup} \times WIDTH_{windup} \times SPEED_{windup}$$

Thus, the windup weight is determined by rearranging equation (1)

$$WT_{windup} = \frac{WIDTH_{scanner} \times SPEED_{scanner} \times WT_{scanner}}{WIDTH_{windup} \times SPEED_{windup}} \quad (2)$$

The ratio in equation (2) in simpler terms gives what can be termed a growth ratio:

$$\text{GROWTH RATIO} = \frac{S_1 W_1}{S_2 W_2} \quad (3)$$

Here the 1 subscript relates to the SPEED and WIDTH at the scanner location, and the 2 subscript the WIDTH and SPEED at the windup reel in accordance with the notations of FIG. 1. The growth ratio computation of equation (3) provides a distinct correlation between the weight at the scanner and the weight at the windup. This is valuable in assuring dynamic accuracy since it permits the controlling scanner to windup weight targets regardless of changing growth ratios; such change is caused as calender tensions and other set up parameters change from run to run, or in fact, on the same product type.

Moreover, in a closed loop control system the weight per unit area information at the scanner location 27 would be utilized to control the weight of the fabric 21 to a target value. Errors between the desired target and the windup weight can be used in the control system to vary the desired scanner weight.

Thus, the present invention provides the capability of controlling the calender rolls to provide a desired weight at the windup reel. To restate the advantages of the foregoing invention in other terms, even assuming a perfectly controlled closed loop control system using the scanner gauge at location 27 where the weight per unit area is controlled to a constant value, line conditions will cause the fabric to shrink back at a rate not exactly proportional to the time of dynamic calibration. Thus, the final windup weight variance will be greater than the weight variance indicated at the gauging scanner unit 27. The method of present invention remedies the foregoing by compensating for such variations in fabric such as rebound.

What is claimed is:

1. A method of measuring the windup weight per unit area of a moving stretchable material being manufactured by a machine, said material being held under tension between rolls and windup reel, comprising the following steps: sensing the weight per unit area of said moving material at a scanning location displaced from said windup reel; sensing the width and speed of said material at said location; sensing the width and speed of said material at said windup reel; and determining windup weight by $$WT_{windup} = \frac{WIDTH_{scanner} \, SPEED_{scanner}}{WIDTH_{windup} \, SPEED_{windup}} \times WT_{scanner}$$

2. The method of claim 1 together with the steps of comparing said windup weight per unit area with a target value for said weight and adjusting said machine such that any difference between said windup weight and said target weight is diminished.

3. A method of measuring the windup weight per unit area of a moving stretchable material being manufactured by a machine, said material being held under tension between rolls and windup reel, comprising the following steps: sensing the weight per unit area of said moving material at a scanning location displaced from said windup reel; sensing the width of said material at said location and at said windup reel; and determining windup weight $$WT_{windup} = WIDTH_{scanner}/WIDTH_{windup} \times WT_{scanner} \times K_1.$$

4. A method of measuring the windup weight per unit area of a moving stretchable material being manufactured by a machine, said material being held under tension between rolls and windup reel, comprising the following steps: sensing the weight per unit area of said moving material at a scanning location displaced from said windup reel; sensing the speed of said material at said location and at said windup reel; and determining windup weight by $$WT_{windup} = SPEED_{scanner}/SPEED_{windup} \times WT_{scanner} \times K_2.$$

* * * * *